United States Patent [19]

Widenhorn

[11] Patent Number: 5,334,927
[45] Date of Patent: Aug. 2, 1994

[54] MULTIPHASE SWITCHING SYSTEM AND GENERATOR ARRANGEMENT HAVING SUCH A SWITCHING SYSTEM

[75] Inventor: Leonhard Widenhorn, Zug, Switzerland

[73] Assignee: Asea Brown Boveri Ltd., Baden, Switzerland

[21] Appl. No.: 43,021

[22] Filed: Apr. 5, 1993

[30] Foreign Application Priority Data

Apr. 28, 1992 [CH] Switzerland .................. 1371/92

[51] Int. Cl.$^5$ ...................... H02B 1/00; H02J 3/00
[52] U.S. Cl. ...................... 322/100; 307/87; 322/90
[58] Field of Search .............. 307/87; 322/100, 90

[56] References Cited

U.S. PATENT DOCUMENTS 4,761,563  8/1988  Ross et al. .................. 307/87

FOREIGN PATENT DOCUMENTS 1910871  9/1970  Fed. Rep. of Germany .
3005950A1  8/1981  Fed. Rep. of Germany .
3506383C2  12/1988  Fed. Rep. of Germany .
3329404C2  1/1992  Fed. Rep. of Germany .

*Primary Examiner*—R. J. Hickey
*Attorney, Agent, or Firm*—Burns, Doane, Swecker & Mathis

[57] ABSTRACT

In the case of the multiphase switching system (1), each (for example $L_3$) of the phase conductors is arranged in the course of a generator output line (2), which is arranged between a generator (7) and a network transformer (8), together with a switching apparatus, in encapsulation (5) which is insulated by air gaps, in a manner isolated from the other phase conductors.

The switching system is intended to allow virtually all the switching, protection, and measurement functions occurring in a generator arrangement to be executed despite a compact and space-saving construction.

This is achieved by the switching apparatus (three-position interrupter switch 10) having at least two switching positions. A first of these two switching positions is arranged between the generator (7) and an output of the switching system (1) which acts on the network transformer (8). A second of these two switching positions is in contrast located between the generator (7) and a current connection (20) of a starting device (21) which is located outside the encapsulation (for example 5) and acts on the generator (7) when the first switching position is open and the second switching position is closed.

In the case of a generator arrangement which is equipped with such a switching system (1) a load interrupter switch or interrupter switch, which is used for the current connection of the starting device (21) to the generator (7), can be saved.

15 Claims, 4 Drawing Sheets

MULTIPHASE SWITCHING SYSTEM AND GENERATOR ARRANGEMENT HAVING SUCH A SWITCHING SYSTEM

BACKGROUND OF THE INVENTION

1. Field of the Invention

The invention is based on a multiphase switching system in which each of the phase conductors is arranged in encapsulation, insulated in terms of the phase from the other phase conductors, in the course of a generator output line, which is arranged between a generator and a network transformer, together with a first switching apparatus or a first switching apparatus combination.

2. Discussion of Background

In this case, the invention makes reference to a prior art as results, for example, from DE-C2-33 29 404. In this patent publication, a multiphase switching system which is installed in the course of a generator output line is described, in which each of the phase conductors is installed in cylindrical metal encapsulation, arranged on the cylinder axis, with in each case one generator switch, one grounding switch and one current transformer. In order to execute specific switching functions, such as those which are executed, for example, during starting and/or braking of the generator of a generator arrangement containing such a switching system, this switching system requires further additional load interrupter switches, interrupter switches and/or measurement and protection components which are arranged outside the encapsulations.

A generator arrangement having a device for starting the generator which is provided in a gas turbine system is disclosed, for example, in FIG. 10 in the Combined-Cycle Power Plants Series KA 11 and KA 13 document, Publication No. CH-KW 2009 E document, issued by the applicant. In addition to a switching system containing a generator switch, this generator arrangement requires an interrupter switch or load interrupter switch, via which the starting current, which is matched in a frequency converter, is supplied to the generator.

SUMMARY OF THE INVENTION

Accordingly, one object of the invention as it is defined in patent claim 1 is to develop a switching system of the type mentioned initially in such a manner that, despite a compact, space-saving and phase-insulating construction, it can execute virtually all the switching, protection and measurement functions occurring in a generator arrangement. The object of the invention is at the same time to specify a generator arrangement which contains such a switching system and in which the starting of the generator is achieved in a particularly reliable and cost-saving manner.

The switching system according to the invention is distinguished in that it can be produced and tested even at the works as a component which is ready for dispatch and satisfies all the switching, protection and measurement functions which must be ensured in a generator arrangement. At the installation site, the switching system according to the invention can be integrated into the output line of the generator in an extremely simple manner, to be precise essentially merely by connecting the phase conductors and by welding in the encapsulation. The switching system can easily be transported, since the individual phases are constructed as compact encapsulations and can easily be mounted on a supporting frame which is common to all the phases. The individual encapsulations are separated from one another by air gaps so that the switching system and the generator arrangement to be protected are protected as well as possible against fault occurrence. The full encapsulation return current flows via the encapsulation of the switching system. Undesired stray magnetic fields in the vicinity of the switching system are thus considerably reduced.

In the case of the generator arrangement containing such a switching system, an interrupter or load interrupter switch provided between the generator and a starting device can be saved, since the switching apparatus provided in the course of the generator output line can produce both the connection from the generator to the network and, alternatively, the connection from the generator to the starting device. The generator arrangement operates in a particularly advantageous manner when a generator switch is provided between the generator and the switching apparatus, since the current supplied from the starting device to the generator during starting and the current emitted by the generator during braking are now switched directly by the generator switch. In this case, the protection during starting and/or braking of the generator, which protection is provided for continuous operation of the generator and has the generator switch as a central component, also acts in the circuit containing the starting device and/or a braking device. The starting device and/or braking device is thus protected against impermissible modes of operation and short-circuit input supplies through the generator switch, without additional cost.

Exemplary embodiments of the invention and the advantages which can be achieved therewith are explained in more detail in the following text, with reference to drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
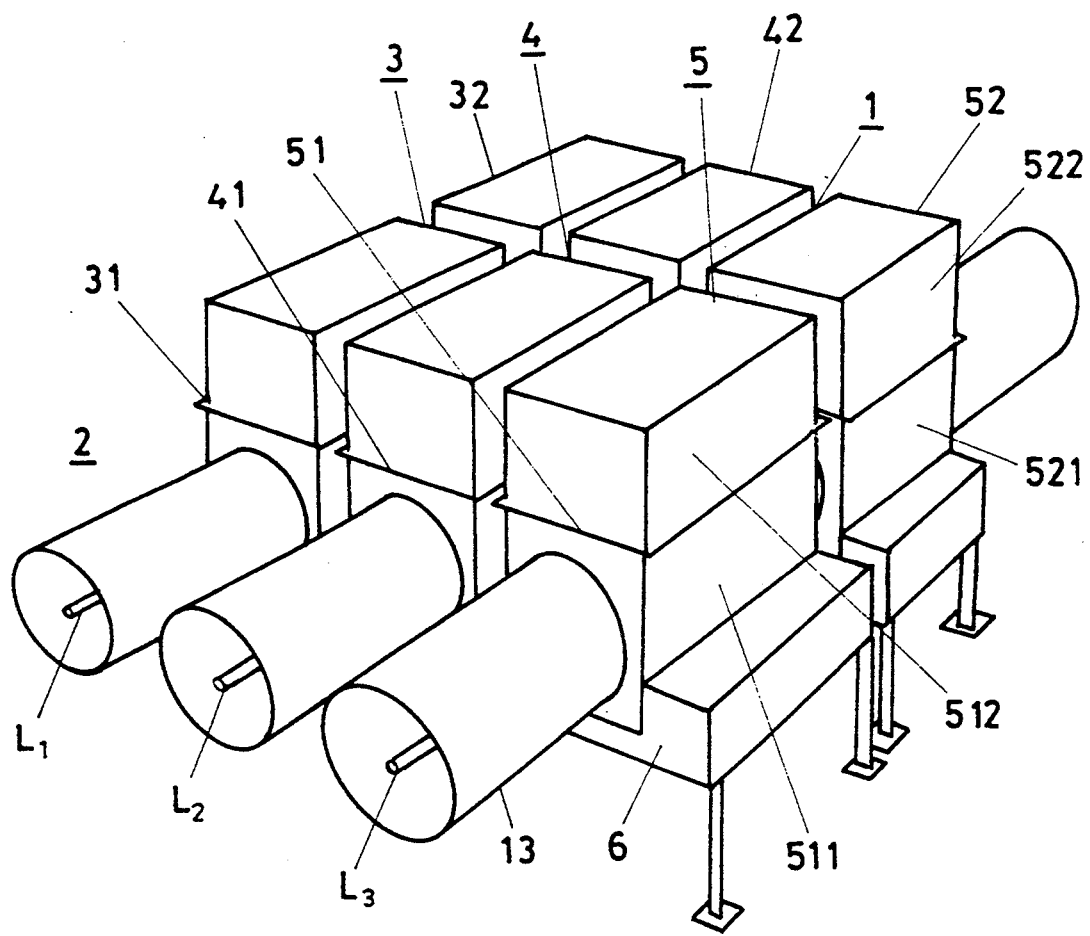
FIG. 1 shows a perspective view of a first embodiment of a multiphase switching system according to the invention.

Referring now to the drawings, wherein like reference numerals designate identical or corresponding parts throughout the several views, the switching system 1 shown in FIG. 1 can be installed in the course of a generator output line 2 between a generator, which is not shown, and a transformer, which is likewise not shown, of an electrical power supply and/or distribution network. The switching system contains 3, possibly, however, even more, encapsulations 3, 4, 5 which are aligned parallel to one another, are metallically conductive, are used to carry the return current and respectively in each case hold one of three phase conductors $L_1$, $L_2$ and $L_3$ which are provided in the generator output line 2. Each of the encapsulations 3, 4, 5 is in each case constructed from two encapsulation elements 31, 32; 41, 42; 51, 52, which are arranged in the course of one phase conductor $L_1$, $L_2$, $L_3$ and are constructed in the form of boxes.

Encapsulation elements 31, 41, 51, which are arranged on the generator side, form a first partial switching system and in each case contain at least one generator switch and possibly a further switching apparatus, such as a grounding switch and/or an interrupter switch, as well as additional components, such as current transformers and voltage converters and/or other sensors, suppressors and/or capacitors for protection of one or more transformers.

Encapsulation elements 32, 42, 52, which are arranged on the transformer side, form a second partial switching system and in each case contain a further switching apparatus or a switching apparatus combination having at least two switching points and, possibly, likewise further switching apparatuses and/or further additional components, such as current transformers and voltage converters, suppressors and/or protection capacitors.

The two encapsulation elements 31, 32; 41, 42; 51, 52, which are provided for in each of the phases, may possibly be constructed as an integral encapsulation element. This element then contains both the generator switch and the further switching apparatus or the switching apparatus combination as well as the additional components. Depending on the requirement, the sequence of the partial switching systems may also be reversed.

The encapsulation elements, for example 51, 52, in each case contain a lower encapsulation part, for example 511, 521, which rests on a supporting frame 6 and has two openings for connection of the phase conductor, for example $L_3$, which is arranged in cylindrical encapsulation, for example 13, of the generator output line 2 on the cylinder axis, as well as a cover, for example 512, 522, which is detachably connected to the lower encapsulation part, for example 511, 521. All the components of the switching system 1, such as the generator switch, the further switching apparatus or the switching apparatus combination having at least two switching points and the additional components, are mounted in the lower encapsulation parts, for example 511, 521, and are easily accessible after opening of the covers, for example 512, 522, for inspection and installation purposes. The encapsulation parts, for example 521, which are arranged on the transformer side, have a further opening on the rear side which is not shown for passing through a current supply line of a device which is arranged outside the encapsulation and is not shown, for starting and/or braking the generator.

Figure 2:
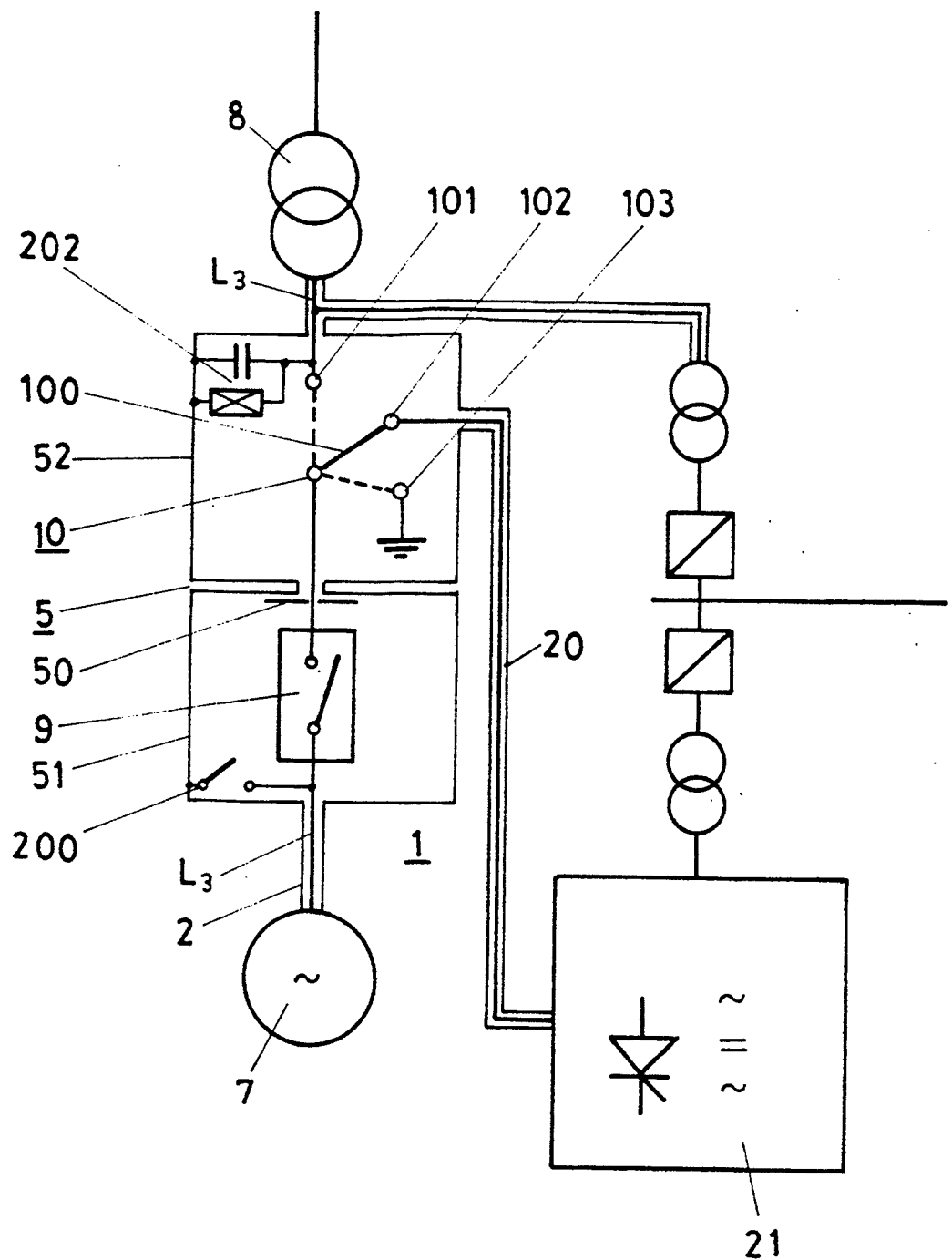
FIG. 2 shows a greatly simplified circuit diagram, only one phase of which is represented, of a generator arrangement having the switching system according to FIG. 1 and having a device for starting the generator.

FIG. 2 shows the arrangement of the switching system 1 in a generator arrangement, in a single-phase representation, related to the phase conductor $L_3$. It can be seen from this that the encapsulation 5 of the switching panel 1 is arranged with the two encapsulation elements 51, 52 between a generator 7 and a network transformer 8. The phase conductor $L_3$, which is guided into the encapsulation element 51 in the course of the generator output line 2, is electrically conductively connected to a current connection of a generator switch 9 which is provided in the encapsulation element 51. A further current connection of the generator switch 9 is connected in the course of the continuing phase conductor $L_3$, in an electrically conductive manner, to a moving contact 100 of a three-position interrupter switch 10 which is provided in the encapsulation element 52. In addition to the moving contact 100, the three-position interrupter switch 10 contains three stationary contacts 101, 102 and 103 which are electrically conductively connected in series with a section of the phase conductor $L_3$ which is connected to the network transformer 8, to a current connection 20 of a starting device 21 which is supplied from the network, and to the frame of the switching system 1 or to earth or to an insulated short-circuit. There is still sufficient space in the encapsulation elements 51, 52 for the arrangement of further additional components 201, 202, such as further switching apparatuses, current transformers and voltage converters, suppressors and/or protection capacitors. An insulating barrier 50 is provided in the encapsulation element 51 for the purpose of increased protection against electric shocks during servicing tasks in the encapsulation element 52.

This generator arrangement now operates as follows:

The three-position interrupter switch 10 has three switching positions of which two are open and a third is closed.

(1) During an inspection of the arrangement, a first switching position, which is formed by the moving contact 100 and the stationary contact 101, and a second switching point, which is formed by the moving contact 100 and the stationary contact 102, are open. A third switching position, which is formed by the moving contact 100 and by the stationary contact 103, is then closed. The generator 7 is isolated from the network transformer 8 and the starting device 21, and the section of the phase conductor $L_3$ which is connected to the moving contact 100 of the three-position interrupter switch 10 is then grounded (the position of the three-position interrupter switch 10 shown in dashed lines in FIG. 2). The insulating barrier 50 acts between the encapsulation elements 51 and 52 for the purpose of personnel protection.

(2) In order to accelerate the generator 7, the third switching position is initially opened and the second switching position closed (the position of the three-position interrupter switch 10 shown in continuous lines in FIG. 2), with the generator switch 9 open. As before, the generator 7 is isolated from the network transformer 8. As a result of the generator switch 9 being switched on, a connection is now produced between the generator 7 and a frequency converter or a "back-to-back" starting machine of the starting device 21. The generator 7 is accelerated by suitably controlling the starting device 21.

(3) As soon as the generator 7 has reached a speed which is sufficient for synchronous connection to the network, or can accelerate further without an external supply, the starting device 21 is isolated from the generator 7 by opening the generator switch 9 (the position of the three-position interrupter switch 10 shown in solid lines in FIG. 2).

(4) The second switching position is subsequently opened and the first switching position closed. The generator switch 9 is now connected on one side to the network transformer 8 (the position of the three-position interrupter switch 10 shown in dotted lines in FIG. 2).

(5) By closing the generator switch 9, the accelerated generator 7 is then synchronously connected to the network and feeds into the network transformer 8 via the generator switch 9 and the first switching position 10 of the three-position interrupter switch 10.

(6) If required, the generator 7 can be braked by operation of the switching system 1 in a suitably adapted manner. For this purpose, the current emitted from the generator 7 is passed via the closed generator switch 9 and the three-position interrupter switch 10 to the stationary contact 103, which acts as insulated short-circuit and is constructed as the star point of the three phase conductors.

Figure 3:
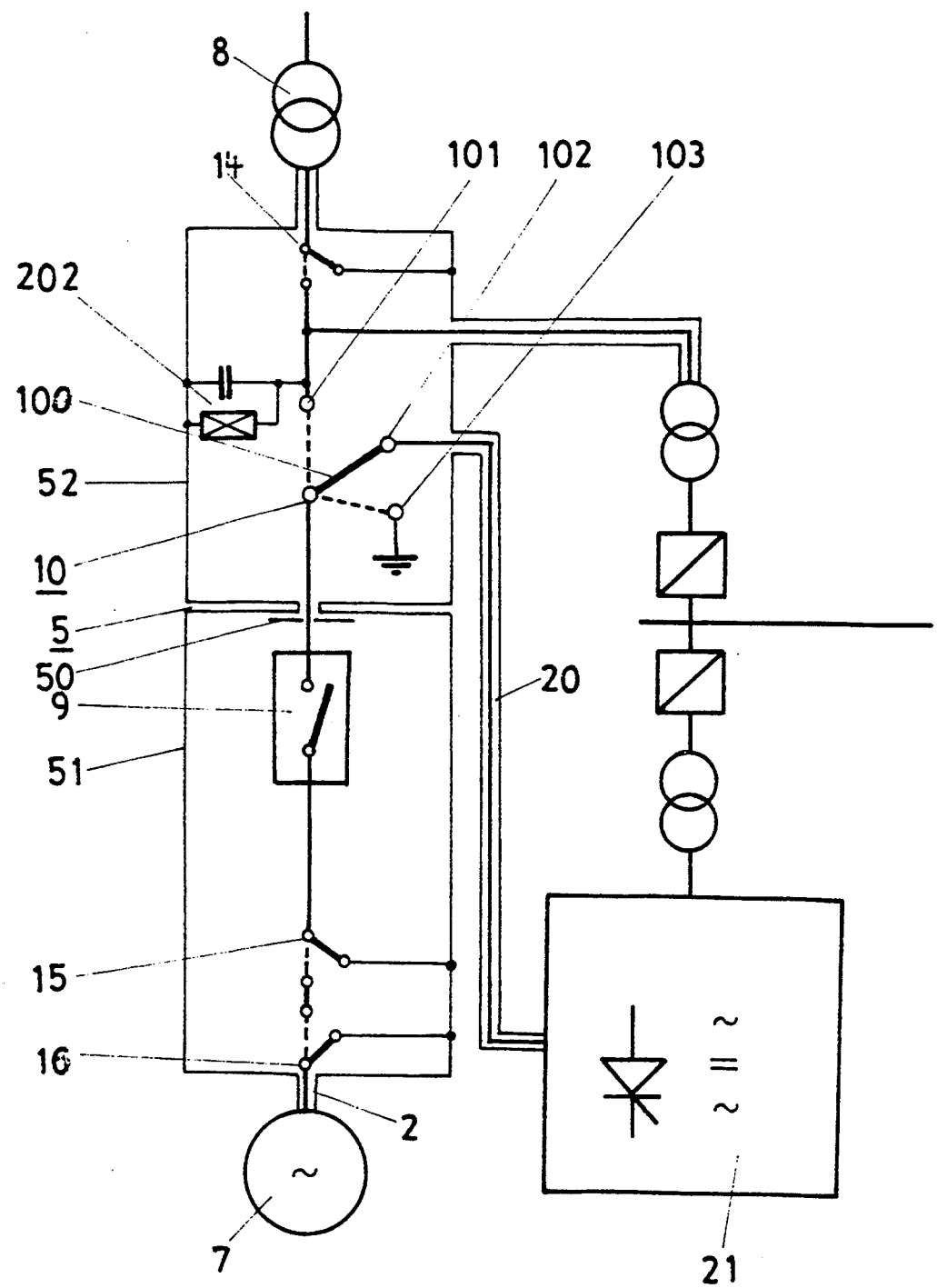
FIG. 3 shows a greatly simplified circuit diagram, only one phase of which is represented, of a generator arrangement having a second embodiment of the switching system according to the invention and having a device for starting the generator.

In the case of the alternative embodiment of the switching system 1 according to the invention shown in FIG. 3, in addition to the three-position interrupter switch 10 or a correspondingly acting switching apparatus combination and the generator switch 9, three switching apparatuses 14, 15, 16, which are preferably constructed as two-position interrupter switches, are arranged in the course of the generator output line 2 in the encapsulations 5. These switching apparatuses 14, 15, 16 can in each case act alternatively as continuity isolators or as grounding devices. In consequence, this additionally results in it being possible to service any components of the generator arrangement, such as the generator 7, the network transformer 8 or the generator switch 9, independently of one another. The number of switching apparatuses 14, 15, 16 may be increased or reduced depending on the requirement of the generator arrangement.

Figure 4:
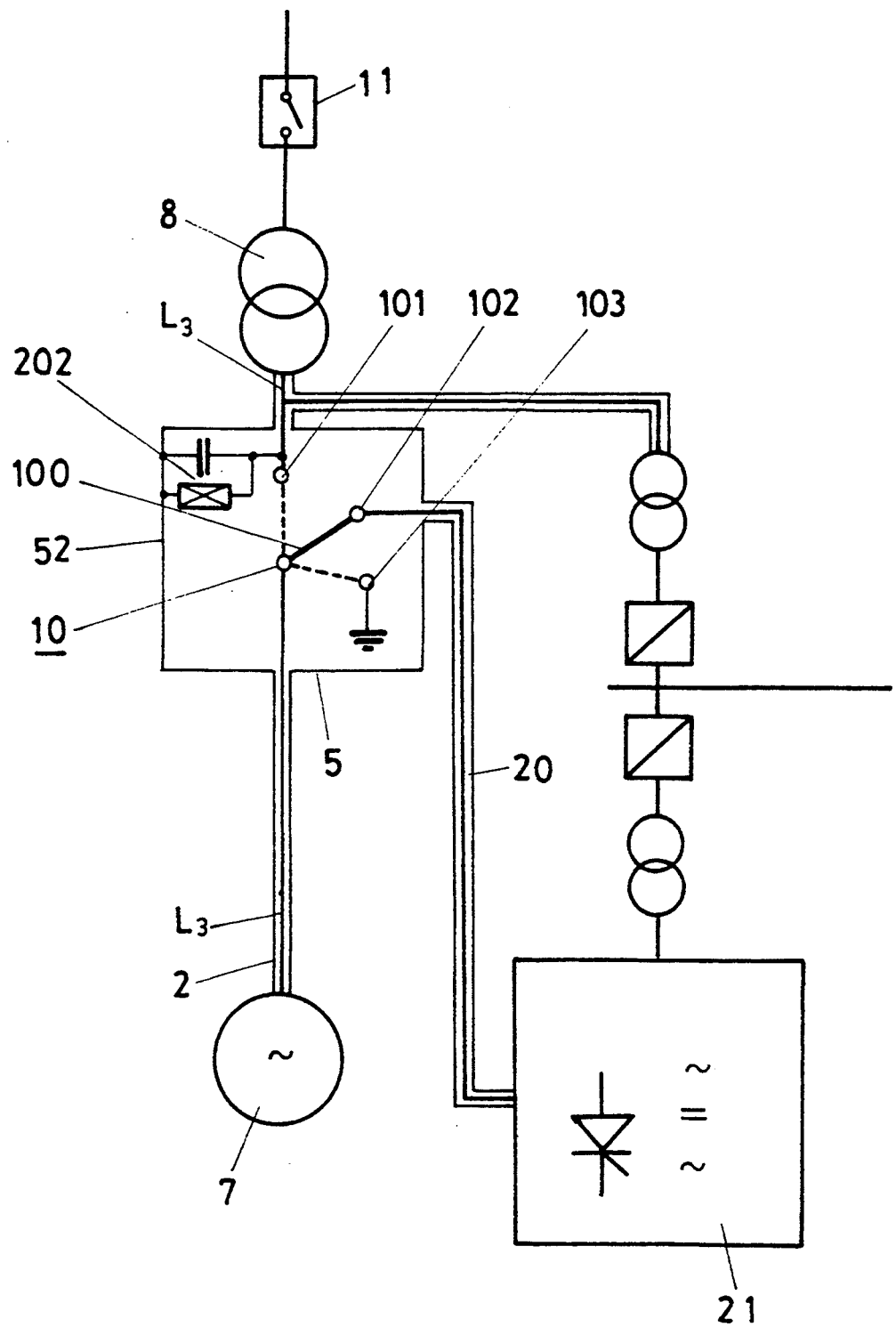
FIG. 4 shows a greatly simplified circuit diagram, only one phase of which is represented, of a generator arrangement having a third embodiment of the switching system according to the invention and having a device for starting the generator.

In the case of the third embodiment of the switching system 1 according to the invention, which is shown in FIG. 4, the three-position interrupter switch 10 or a switching apparatus combination acting in a corresponding manner has a moving contact 100 which acts directly on the generator 7, without the interposition of a generator switch 9. In the case of this embodiment of the invention, an additional interrupter switch is likewise saved during operation of the starting device 21, since the three-position interrupter switch 10 can take over the following functions: the action as a continuity isolator for the phase conductor $L_3$, the passing of the current from the starting device 21 to the generator 7, and, possibly, the grounding and/or short-circuiting of the windings of the generator 7 during braking.

The functions of the generator switch 9 is in this case taken over by a high-voltage switch 11, which is connected downstream of the network transformer 8 and connects the network transformer 8, and hence the generator 7, to the network, or isolates them therefrom.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by letters patent of the United States is:

1. A multiphase switching system comprising:
   plural phase conductors arranged in an encapsulation, each phase being insulated from the remaining phase conductors in a generator output line, said phase conductors being arranged between a generator and a transformer;
   a first switching apparatus having at least two switching positions, a first of which is arranged between the generator and an output of the switching system to the network transformer, and a second of which is arranged between the generator and a starting device which is arranged outside the encapsulation for connection with the generator when the first switching position is open and the second switching position is closed.

2. The switching system as claimed in claim 1, further including:
   a generator switch which is arranged in the encapsulation and via which the transformer is connected with the generator when the first switching position is closed, and via which the starting device is connected with the generator when the second switching position is closed.

3. The switching system as claimed in claim 2, further including:
   a second switching apparatus arranged in the generator output line, in addition to the first switching apparatus and the generator switch.

4. The switching system as claimed in claim 1, wherein the first switching apparatus further includes:
   a third switching position, which is arranged between the generator and any one of a frame of the switching system or ground or an insulated short-circuit.

5. The switching system as claimed in claim 4, wherein the first switching apparatus further includes:
   a three-position interrupter switch having one moving contact piece which is electrically connected to a phase conductor, and having three stationary contact pieces.

6. The switching system as claimed in claim 4, wherein the first switching apparatus further includes:
   a three position interrupter switch having a moving contact which forms the first switching position with a stationary contact which is electrically connected to a phase conductor, which forms the second switching position with a stationary contact which is electrically connected to the starting device, and which forms the third switching position with a stationary contact which is electrically connected to ground or the frame of the switching system or to the insulated short-circuit.

7. A switching system as claimed in claim 5, further including:
   a first partial switching system which comprises at least the generator switch; and
   a second partial switching system which comprises at least the three-position interrupter switch.

8. The switching system as claimed in claim 7, further including:
   an encapsulation of the second partial switching system which includes a connection to the starting device.

9. The switching system as claimed in claim 1, wherein the encapsulation of the switching system further includes:
   an encapsulation element formed as a box which carries return current.

10. The switching system as claimed in claim 9, wherein the encapsulation element further includes:

an encapsulation part which rests on a supporting frame and contains two openings for connection with a phase conductor; and a cover which is detachably connected to the encapsulation part and carries the return current.

11. The switching system as claimed in claim 1, wherein the encapsulation further includes:

at least one interrupter and/or grounding switch, current transformer and/or voltage converter, suppressor and/or protection capacitor, in addition to the first switching apparatus.

12. A generator arrangement comprising:

a device for starting a generator in a gas turbine installation or a hydroelectric installation;

a multiphase switching system comprising:

plural phase conductors arranged in an encapsulation, each phase being insulated from the remaining phase conductors in a generator output line, said phase conductors being arranged between the generator and a transformer;

a first switching apparatus having at least two apparatus positions, a first of which is arranged between the generator and an output of the switching system to the transformer, and a second of which is arranged between the generator and a starting device which is arranged outside the encapsulation for connection with the generator when the first switching position is open and the second switching position is closed, said starting device having a first current connection to the transformer, and a second current connection with the generator by the first switching apparatus.

13. The generator arrangement as claimed in claim 12, wherein the first switching apparatus further includes:

at least two switching positions which have a common moving contact and in each case one of two stationary contacts, a first switching position being arranged in connection with a phase conductor and a second switching position being arranged in connection with the second current connection of the starting device.

14. The generator arrangement as claimed in claim 13, further including:

a generator switch arranged between the first switching apparatus and the generator, and wherein the first switching apparatus has a third switching position which is formed by the moving contact and by a third stationary contact, via which third switching position the generator can be brought into connection with any one of ground, or a frame of the switching system, or an insulated short-circuit when the generator switch is closed when the first and second switching positions are open.

15. The switching system as claimed in claim 7, wherein the encapsulation of each partial switching system is an encapsulation element formed as a box which carries return current.

* * * * *